US005838003A

United States Patent [19]

Bertsch et al.

[11] Patent Number: 5,838,003

[45] **Date of Patent: *Nov. 17, 1998**

[54] IONIZATION CHAMBER AND MASS SPECTROMETRY SYSTEM CONTAINING AN ASYMMETRIC ELECTRODE

[75] Inventors: James L. Bertsch, Palo Alto; Steven M. Fischer, Hayward; Kent D. Henry, Newark; Eugene M. Wong, Campbell, all of Calif.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 723,201

[22] Filed: Sep. 27, 1996

[51] Int. Cl.[6] ............................ B01D 59/44; H01J 49/00

[52] U.S. Cl. ........................................ 250/288 A; 250/281

[58] Field of Search ................................ 250/288, 288 A, 250/281

[56] References Cited

U.S. PATENT DOCUMENTS

| | | | |
|---|---|---|---|
| 4,531,056 | 7/1985 | Labowsky et al. | 250/288 |
| 4,647,772 | 3/1987 | Lewis et al. | 250/288 |
| 4,851,700 | 7/1989 | Goodley | 250/288 |
| 4,999,493 | 3/1991 | Allen et al. | 250/288 |
| 5,015,845 | 5/1991 | Allen et al. | 250/288 |
| 5,122,670 | 6/1992 | Mylchreest et al. | 250/423 R |
| 5,162,651 | 11/1992 | Kato | 250/288 |
| 5,304,798 | 4/1994 | Tomany et al. | 250/288 |
| 5,495,108 | 2/1996 | Apffel, Jr. et al. | 250/288 |
| 5,559,326 | 9/1996 | Goodley et al. | 250/288 |

*Primary Examiner*—Bruce Anderson

[57] ABSTRACT

The invention relates to an ionization chamber. More particularly, the invention relates to a mass spectrometer system having an electrospray ionization chamber incorporating an asymmetric electrode.

32 Claims, 11 Drawing Sheets

IONIZATION CHAMBER AND MASS SPECTROMETRY SYSTEM CONTAINING AN ASYMMETRIC ELECTRODE

The present invention relates to an ionization chamber. More particularly, the present invention relates to a mass spectrometer system having an electrospray ionization chamber incorporating an asymmetric electrode.

BACKGROUND

Mass spectrometers employing atmospheric pressure electrospray ionization (ESI) have been demonstrated to be particularly useful for obtaining mass spectra from liquid samples and have widespread application. ESI has been used with quadrupole, magnetic and electric sector, Fourier transform, ion trap, and time-of-flight mass spectrometers. ESI mass spectrometry (MS) is frequently used in conjunction with high performance liquid chromatography (HPLC), and combined HPLC/ESI-MS systems are commonly used in the analysis of polar and ionic species, including biomolecular species. ESI has also been used as a MS interface with capillary electrophoresis (CE), supercritical fluid chromatography (SFC), and ion chromatography (IC). ESI-MS systems are particularly useful for transferring relatively nonvolatile and high molecular weight compounds such proteins, peptides, nucleic acids, carbohydrates, and other fragile or thermally labile compounds from the liquid phase to the gas phase while also ionizing the compounds.

ESI is a “soft” or “mild” ionization technique that generates a charged dispersion or aerosol at or near atmospheric pressure and typically at ambient temperature. Since ESI generally operates at ambient temperatures, labile and polar samples may be ionized without thermal degradation and the mild ionization conditions generally result in little or no fragmentation. The aerosol is produced by passing the liquid sample containing solvent and analyte through a hollow needle which is subjected to an electric potential gradient (operated in positive or negative mode). The electric field at the needle tip charges the surface of the emerging liquid which then disperses due the Columbic forces into a fine spray or aerosol of charged droplets. Subsequent heating or use of an inert drying gas such as nitrogen or carbon dioxide is typically employed to evaporate the droplets and remove solvent vapor prior to MS analysis. Variations on ESI systems optionally employ nebulizers, such as with pneumatic, ultrasonic, or thermal “assists”, to improve dispersion and uniformity of the droplets.

ESI chambers preferably are fabricated from metals, since use of plastics in such chambers may result in chemical contamination and out gassing. Metal ESI chambers also possess preferred structural, thermal, and electrical properties. However, using a metal ESI chamber with high liquid sample flowrates, or at low temperatures, may result in frequent electrical breakdown, shorting, arcing, or distortion of the ionizing electric field due to condensation build up or liquid droplets bridging high voltage elements within the ionizing chamber or housing, negatively impacting performance.

What is needed is an electrospray ionization chamber which minimizes or does not suffer from electrical breakdown, shorting, arcing, or distortion of the electric field and which is durable and resistant to chemical contamination.

SUMMARY OF THE INVENTION

In one embodiment, the invention relates to an ionization chamber comprising: (a) a housing at substantially ground potential and containing at least one ionization region; (b) an electrospray assembly at low voltage; (c) an ion sampling means for receiving ions from the ionization chamber, wherein the ion sampling means is at a first high voltage; (d) a counter electrode for attracting ions towards the ion sampling means, wherein the counter electrode is at a second high voltage, the absolute value of the second high voltage being less than the absolute value of the first high voltage; and (e) an electrode asymmetric with respect to the counter electrode, wherein the asymmetric electrode is at a third high voltage substantially equal to the second high voltage and is positioned relative to the electrospray assembly such that electrospray can be initiated and sustained.

In another embodiment, the invention relates to a mass spectrometer system comprising such an ionization chamber.

In a preferred embodiment, the ionization chamber and mass spectrometer system have an ionization region operated substantially at or near atmospheric pressure.

These and other embodiments of the invention are described hereinafter.

BRIEF DESCRIPTION OF THE DRAWINGS

FIG. 2A illustrates the electric fields generated within the ionization chamber with the electrospray assembly at 0 volts, the fifty percent (50%) partial cylinder asymmetric electrode at −5,500 volts, and the capillary assembly at −6,000 volts. The electric field contour lines are at intervals of 500 volts. FIG. 2C illustrates the electric fields generated within the ionization chamber with the electrospray assembly at 0 volts, the zero percent (0%) partial cylinder asymmetric electrode at −5,500 volts, and the capillary assembly at −6,000 volts. The electric field contour lines are at intervals of 500 volts.

FIG. 3A illustrates the electric fields generated within the ionization chamber with the electrospray assembly at 0 volts, the flat circular disc asymmetric electrode at −5,500 volts, and the capillary assembly at −6,000 volts. The electric field contour lines are at intervals of 500 volts.

FIG. 4A illustrates the electric fields generated within the ionization chamber with the electrospray assembly at 0 volts, the wire asymmetric electrode at −5,500 volts, and the capillary assembly at −6,000 volts. The electric field contour lines are at intervals of 500 volts.

DETAILED DESCRIPTION

Figure 1A:
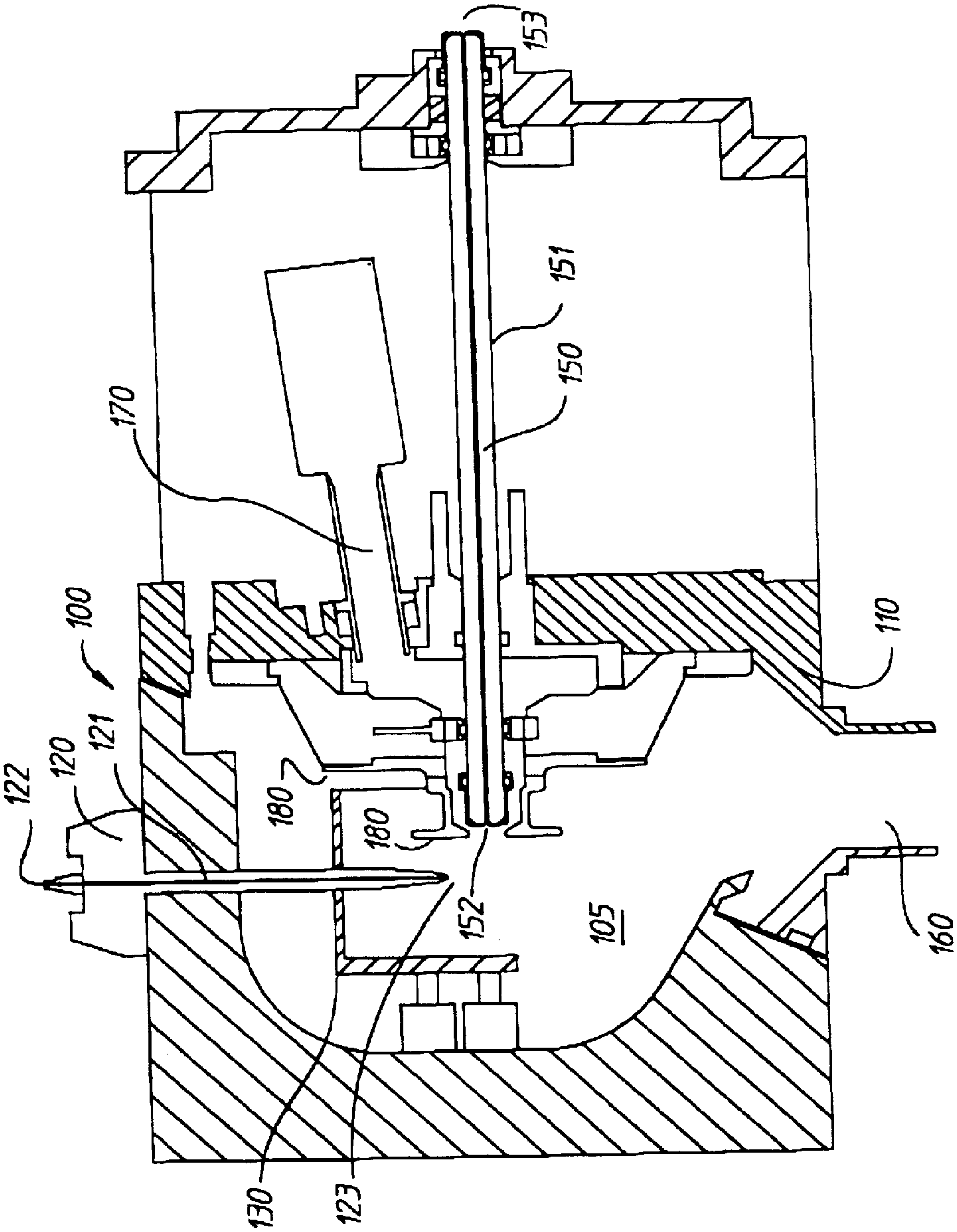
FIG. 1A is a schematic drawing of an ionization chamber of the invention, wherein the asymmetric electrode comprises a partial cylinder electrode which is fifty percent (50%) of a full cylinder and wherein the electrospray assembly and the capillary assembly or orifice are in substantially crossflow orientation.
Figure 1B:
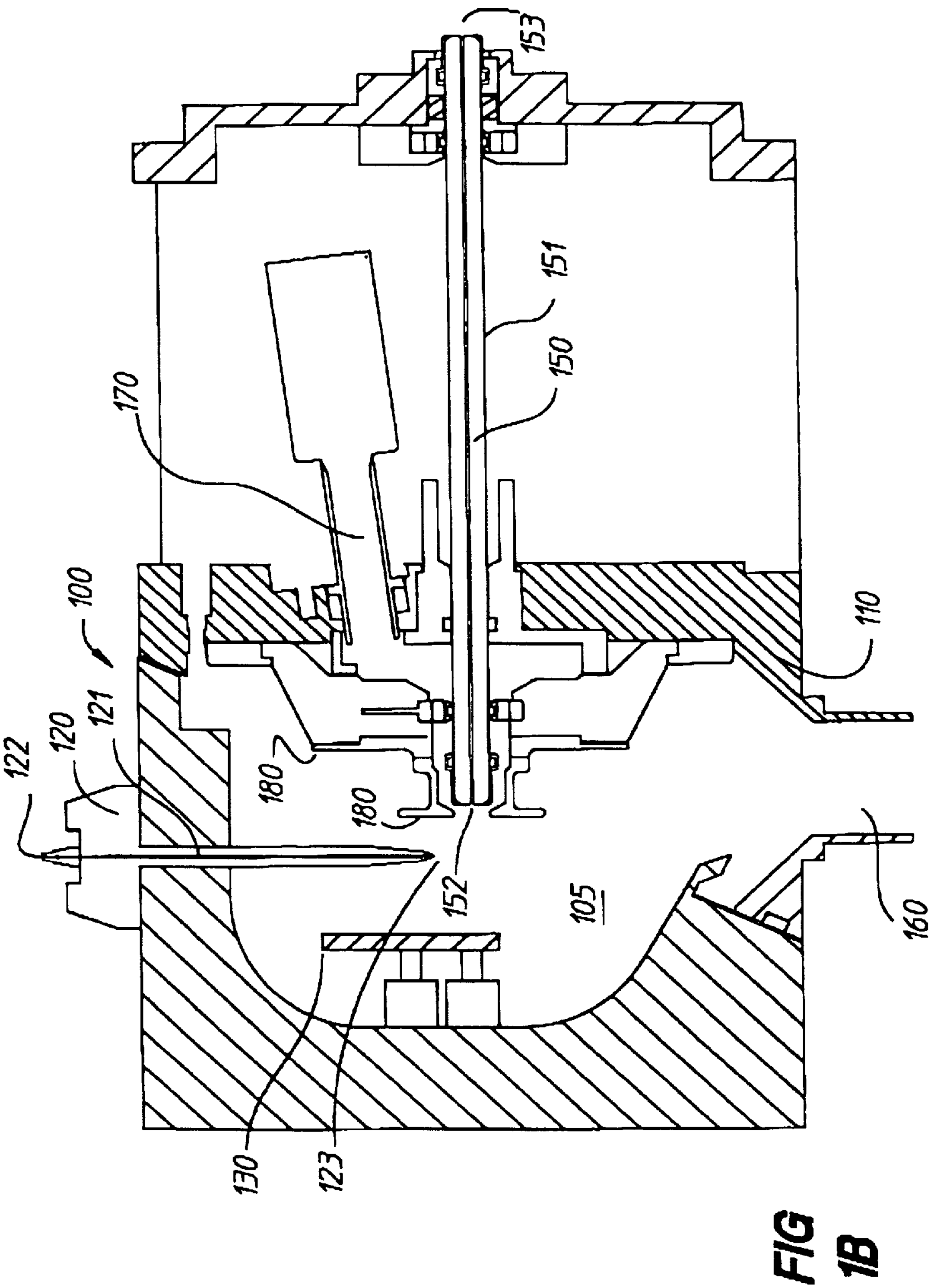
FIG. 1B is a schematic drawing of an ionization chamber of the invention, wherein the asymmetric electrode comprises a partial cylinder electrode which is zero percent (0%) of a full cylinder (that is, the partial cylinder electrode comprises a fiat semicircular plate) and wherein the electrospray assembly and the capillary assembly or orifice are in substantially crossflow orientation.

In the preferred embodiments illustrated in FIGS. 1A and 1B, an ionization chamber (100), for example, an electrospray ionization chamber, comprises a housing (110) containing at least one ionization region (105), preferably operated substantially at or near atmospheric pressure, an electrospray assembly (120), an ion sampling means for receiving ions from the ionization chamber such as a capillary assembly or orifice (150), a counter electrode for attracting ions towards the ion sampling means (180), an asymmetric electrode such as a partial cylinder electrode (130), optionally a drain port or vent (160), and optionally a means of supplying drying gas (170).

The housing of the ionization chamber is preferably operated at substantially ground potential, that is, at a voltage of between about −40 volts and about 40 volts, more preferably at a voltage of between about −10 volts and about 10 volts. The housing may be fabricated from any material providing the requisite structural integrity and which does not significantly degrade, corrode, or out gas under typical conditions of use. Typical housings are fabricated from materials including metals such as stainless steel, aluminum, and aluminum alloys, other electrically conductive materials, and plastics, such as Delrin acetal resin (trademark of Du Pont) and Teflon fluorocarbon polymer (trademark of Du Pont). Composite or multilayer materials may also be used. In a preferred embodiment, the housing is fabricated from a metal or other electrically conductive material; in a more preferred embodiment, the housing is fabricated from a metal; in an even more preferred embodiment, the housing is fabricated from an aluminum alloy.

In FIGS. 1A and 1B, the electrospray assembly (120) and the ion sampling means such as a capillary assembly or orifice (150) are shown arranged in a substantially orthogonal or a cross-flow orientation; in such orientation, the angle between the axial centerlines of the electrospray assembly and the ion sampling means is preferably about 75 degrees to about 105 degrees, more preferably at or about 90 degrees. However, other configurations are possible such as as substantially linear, angular, or off-axis orientations.

The electrospray assembly is preferably operated at low voltage.

Preferably, the electrospray assembly is operated at a low voltage (in positive or negative mode) having an absolute value of less than about 800 volts, more preferably of less than about 600 volts, even more preferably less than about 400 volts. In one preferred embodiment, the electrospray assembly is advantageously operated at substantially ground potential, that is, at a voltage of between about −40 volts and about 40 volts, more preferably at a voltage of between about −10 volts and about 10 volts. Means of supplying the low voltage to the electrospray assembly typically include wires and electrical contacts. During operation, an electrical potential difference is generated between the asymmetric electrode and the electrospray assembly exit on the order of about 1,000 volts to about 8,000 volts.

As illustrated in FIGS. 1A and 1B, the electrospray assembly (120) comprises a hollow needle (121) with an inlet (122) to receive liquid samples, such as from a liquid chromatograph, flow injecter, syringe pump, infusion pump, or other sample introduction means, and an exit (123). An optional concentric tube or sheath with inlet and exit may be used to introduce nebulizing gas or liquid to assist in the formation of the aerosol. Other "assisted" electrospray techniques can be used in conjunction with the present invention, such as pneumatic nebulization. The electrospray assembly (120) is typically fabricated from stainless steel or optionally stainless steel and fused silica.

The ion sampling means such as the capillary assembly (150) illustrated in FIGS. 1A and 1B comprises a capillary (151) with an inlet (152) and an exit (153), and optional means of introducing drying gas (170) into the ionization chamber (100). The capillary is typically fabricated from glass and metal. In an alternate embodiment, the capillary assembly may be replaced by an orifice. The ion sampling means is preferably operated at a high voltage. Means of supplying the high voltage to the ion sampling means typically include wires and electrical contacts. The ion sampling means is operated at a high voltage (in positive or negative mode), the absolute value of which is preferably from about 1,000 volts to about 8,000 volts, more preferably from about 2,500 volts to about 6,000 volts.

In FIGS. 1A and 1B, the counter electrode for attracting ions towards the ion sampling means is depicted as an end plate (180). In other embodiments, the counter electrode may comprise a variety of shapes and sizes. Means of supplying high voltage to the counter electrode typically include wires and electrical contacts. The counter electrode is preferably operated at a high voltage (in positive or negative mode), the absolute value of which is less than the absolute value of the high voltage applied to the ion sampling means. The counter electrode is operated at a voltage (in positive or negative mode), the absolute value of which is preferably from about 1,000 volts to about 8,000 volts, more preferably from about 2,500 volts to about 6,000 volts.

The asymmetric electrode (130) may comprise a variety of shapes and sizes, provided that the electrode possesses radial asymmetry with respect to the counter electrode or with respect to the central axis of the ion sampling means. The asymmetric electrode is further positioned relative to the electrospray assembly such that electrospray can be initiated and sustained without frequent electrical breakdown, shorting, arcing, or distortion of the ionizing electric field due to condensation build up or liquid droplets bridging high voltage elements within the ionization chamber or housing. The asymmetric electrode may be, for example, a partial cylinder (including a flat semicircular plate), a flat circular disc, a wire, or other shape.

Figure 2A:
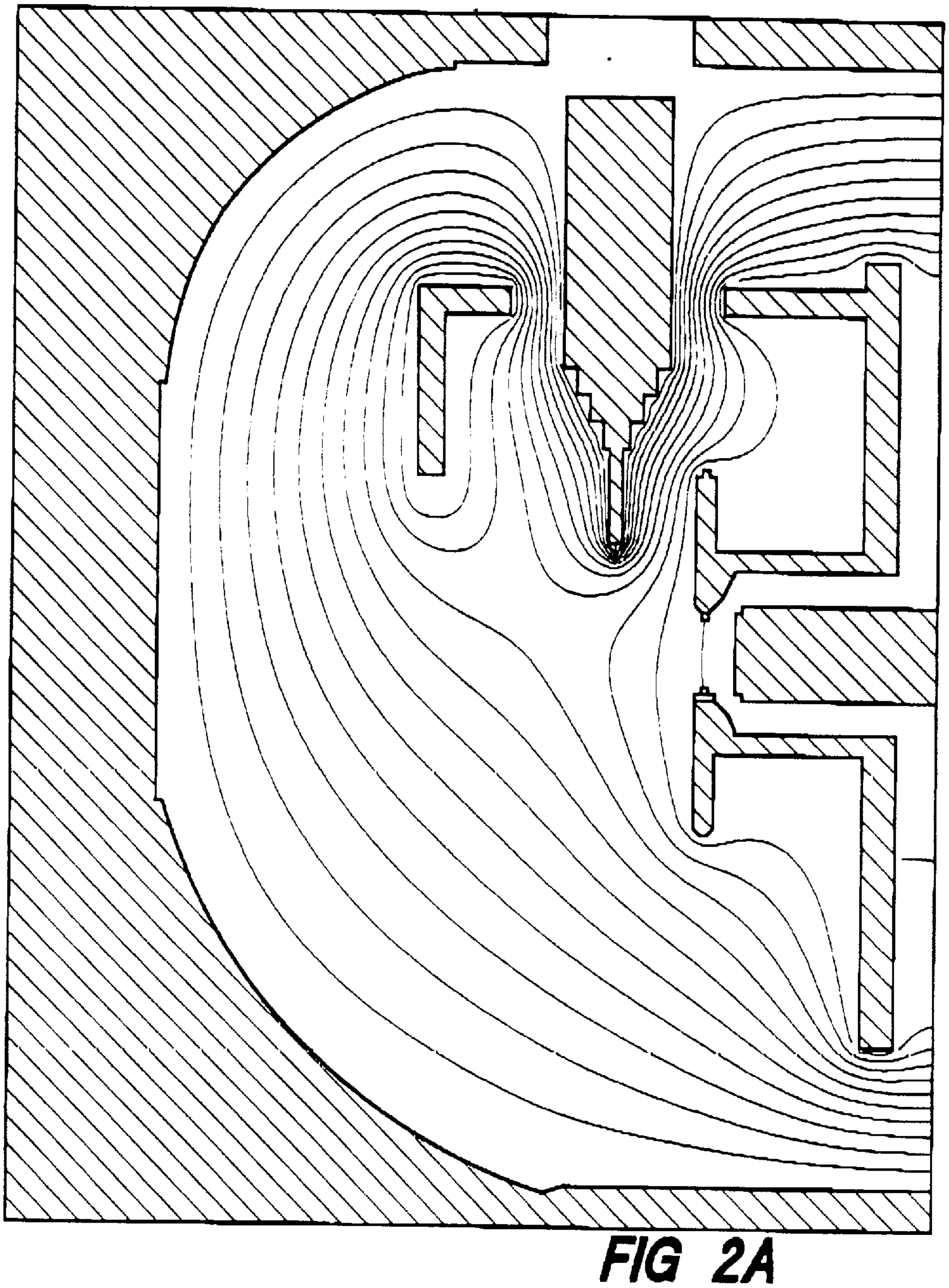
FIGS. 2A and 2B depict respectively the electric fields and the dimensional representation of the fifty percent (50%) partial cylinder electrode within the ionization chamber of FIG. 1A.
Figure 2B:
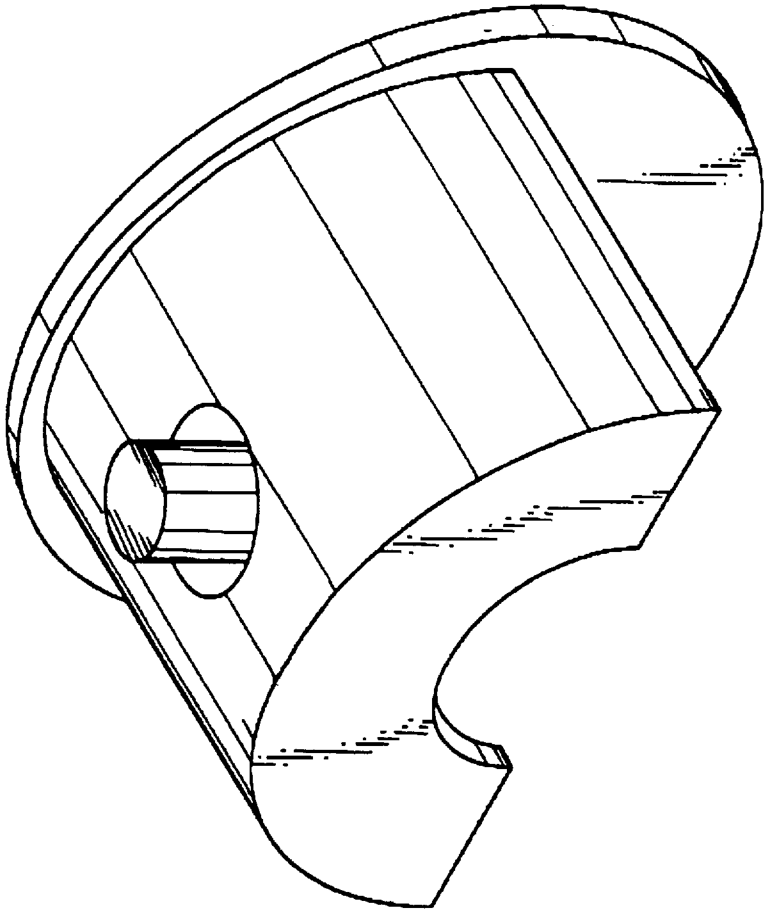
Figure 2C:
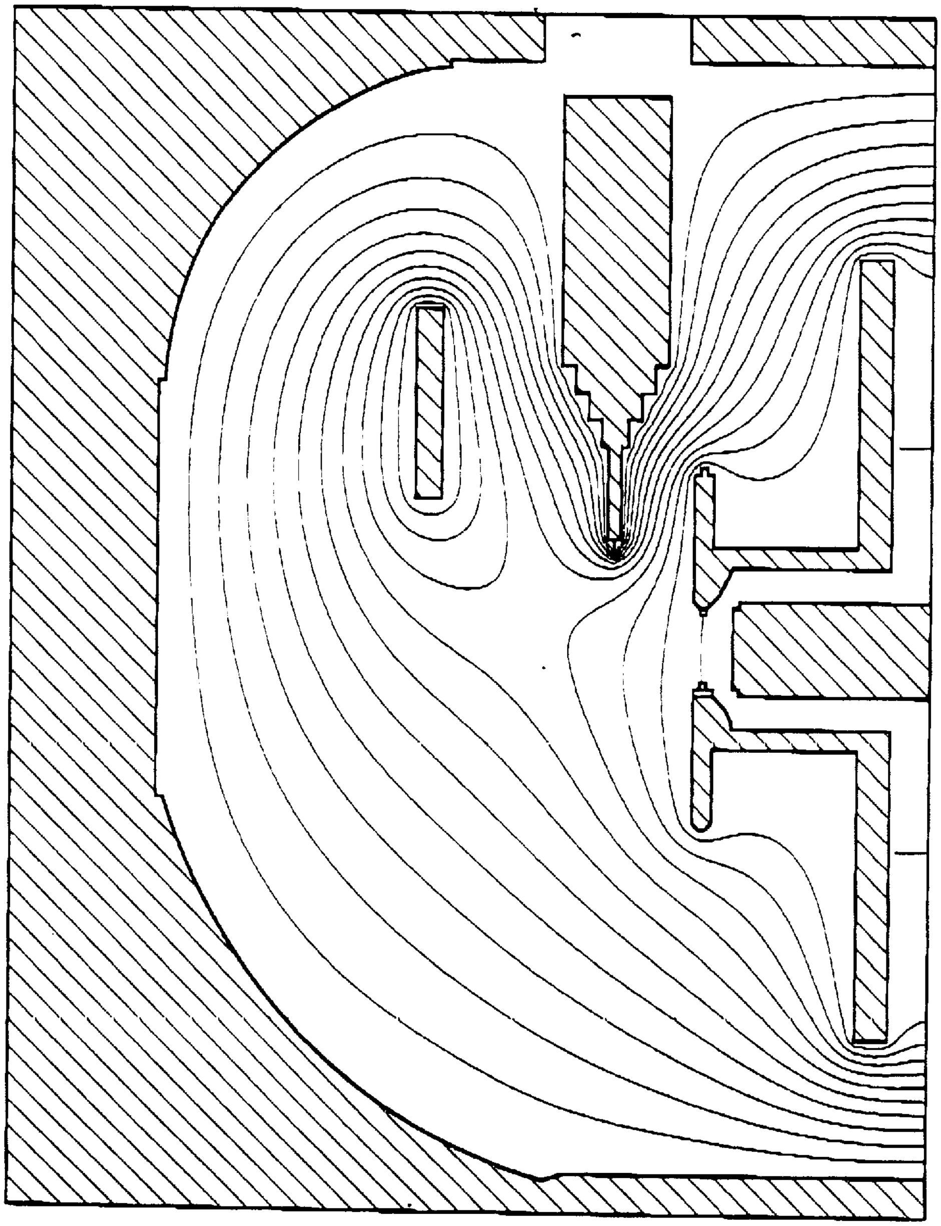
FIGS. 2C and 2D depict respectively the electric fields and the dimensional representation of the zero percent (0%) partial cylinder electrode within the ionization chamber of FIG. 1B.
Figure 2D:
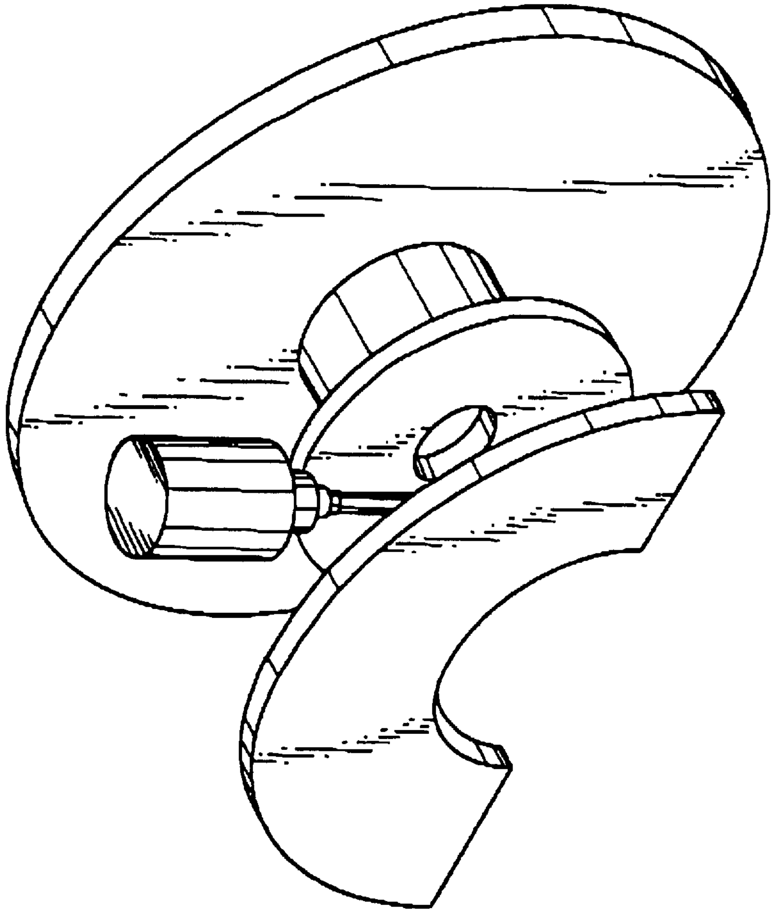

In one embodiment, the asymmetric electrode comprises a partial cylinder as illustrated in FIGS. 1A and 2B which at least partially encompasses the exit (123) end of the electrospray assembly (120). A partial cylinder which is fifty percent (50%) of a full cylinder generates a sufficient electrical field, depicted in FIGS. 2A and 5, to initiate and sustain electrospray ionization with a suitably charged dispersion being generated. The circumference of the partial cylinder may vary from about 0.0 to about 87.5 percent of a full cylinder, preferably from about 12.5 to about 87.5 percent of a full cylinder, more preferably from about 12.5 to about 75.0 percent of a full cylinder, even more preferably from about 12.5 to about 50 percent of a full cylinder. (A flat semicircular plate, as illustrated in FIGS. 1B and 2D is represented by a partial cylinder having a circumference of zero percent (0%) of a full cylinder.)

An alternate manner of referring to the extent of the circumference of the partial cylinder electrode is the degree extent of the partial cylinder, wherein 360 degrees represents a full (100 percent) cylinder. For example, a 180 degree extent of a partial cylinder is equivalent to a 50.0 percent partial cylinder, a 270 degree extent of a partial cylinder is equivalent to a 75.0 percent partial cylinder, and a 315 degree extent of a partial cylinder is equivalent to an 87.5 percent partial cylinder.

Figure 3A:
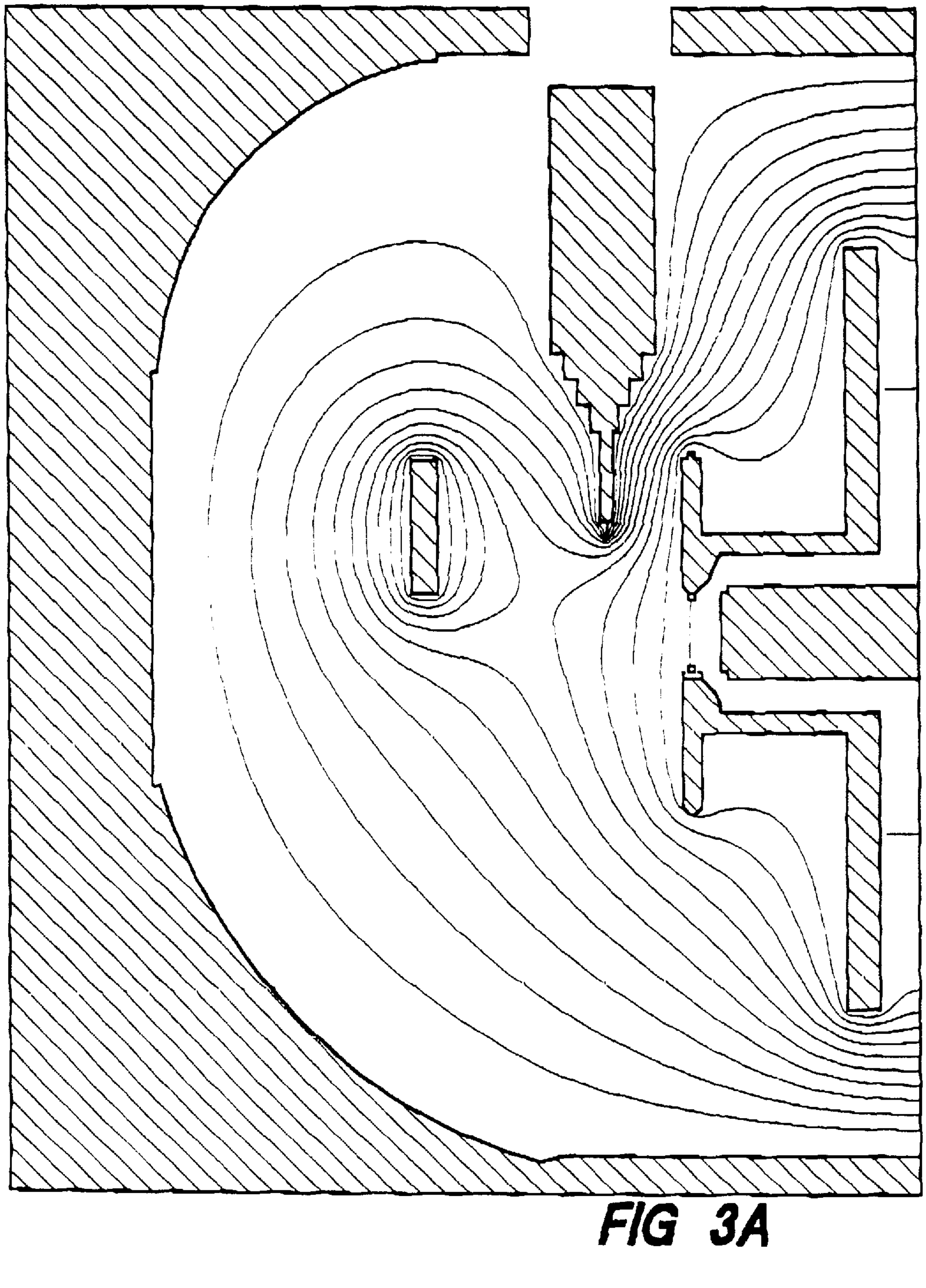
FIGS. 3A and 3B depict respectively the electric fields and the dimensional representation of the asymmetric electrode within an ionization chamber of the invention, wherein the asymmetric electrode comprises a flat circular disc and wherein the electrospray assembly and the capillary assembly or orifice are in substantially crossflow orientation.
Figure 3B:
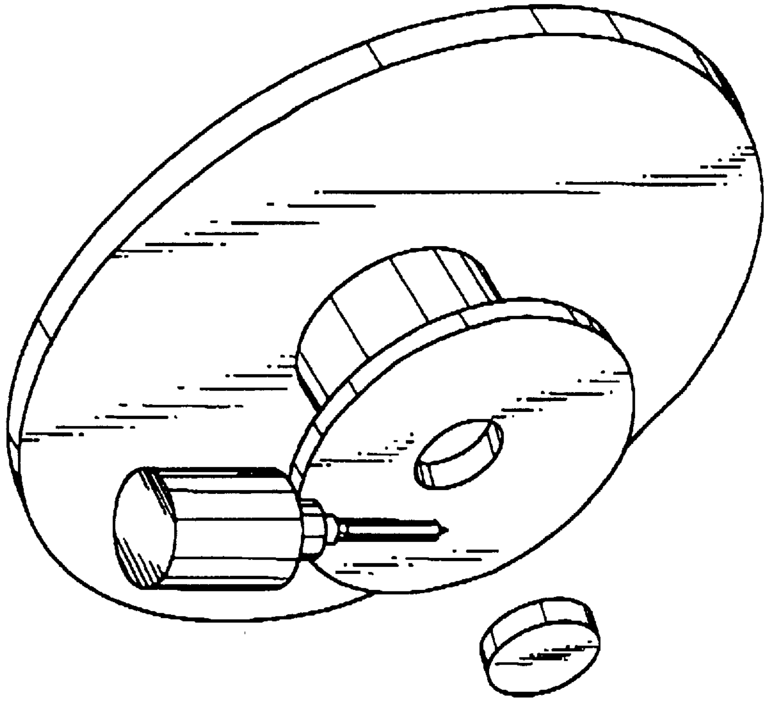

In another embodiment, the asymmetric electrode may comprise a flat circular disc, as illustrated in FIG. 3B. FIG. 3A illustrates the electric fields generated within an ionization chamber of the invention employing such an asymmetric electrode and wherein the electrospray assembly and the capillary assembly or orifice are in substantially crossflow orientation. Such an electric field is sufficient to initiate and sustain electrospray ionization with a suitably charged dispersion being generated.

Figure 4A:
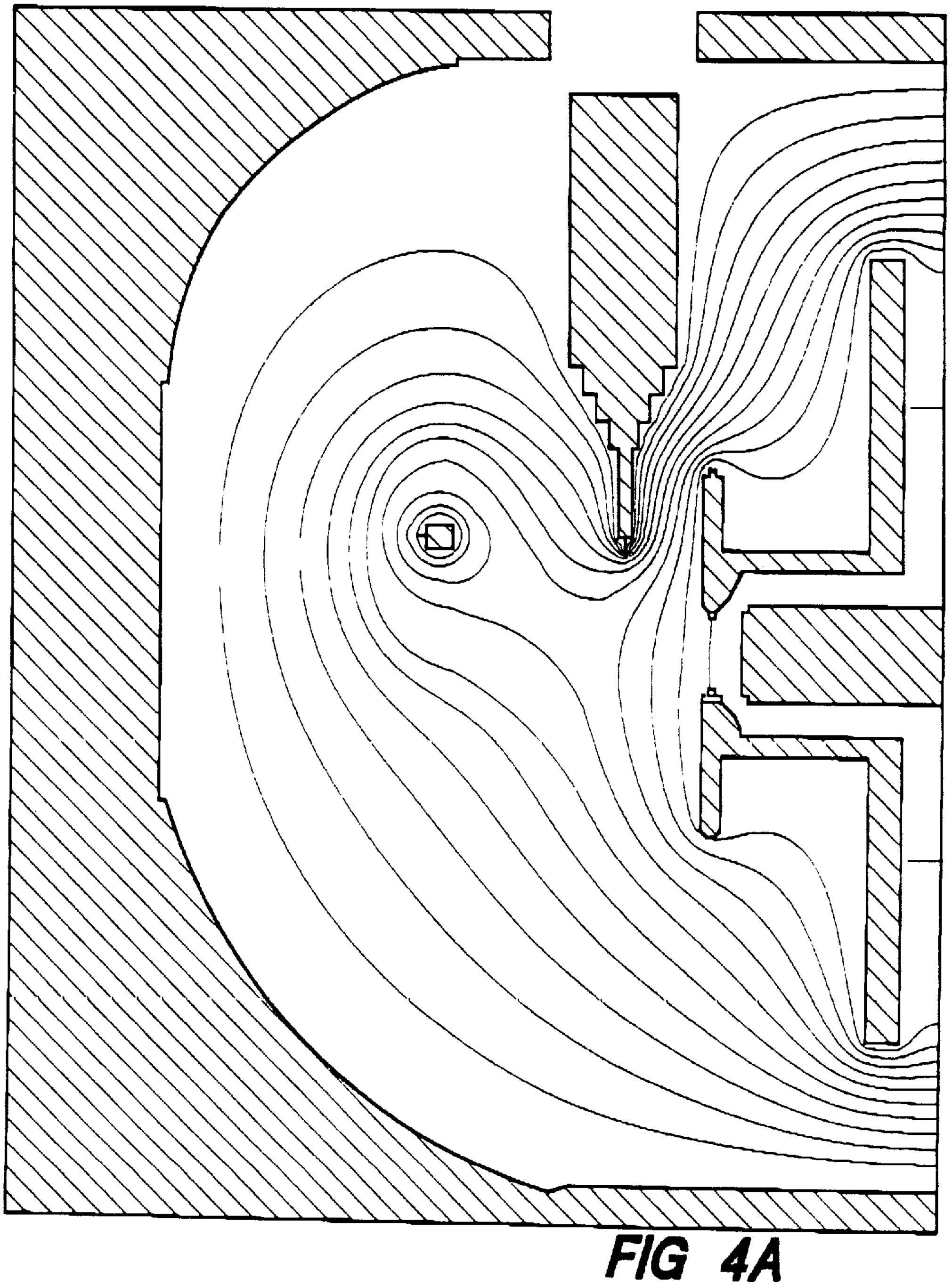
FIGS. 4A and 4B depict respectively the electric fields and the dimensional representation of the asymmetric electrode within an ionization chamber of the invention, wherein the asymmetric electrode comprises a wire and wherein the electrospray assembly and the capillary assembly or orifice are in substantially crossflow orientation.
Figure 4B:
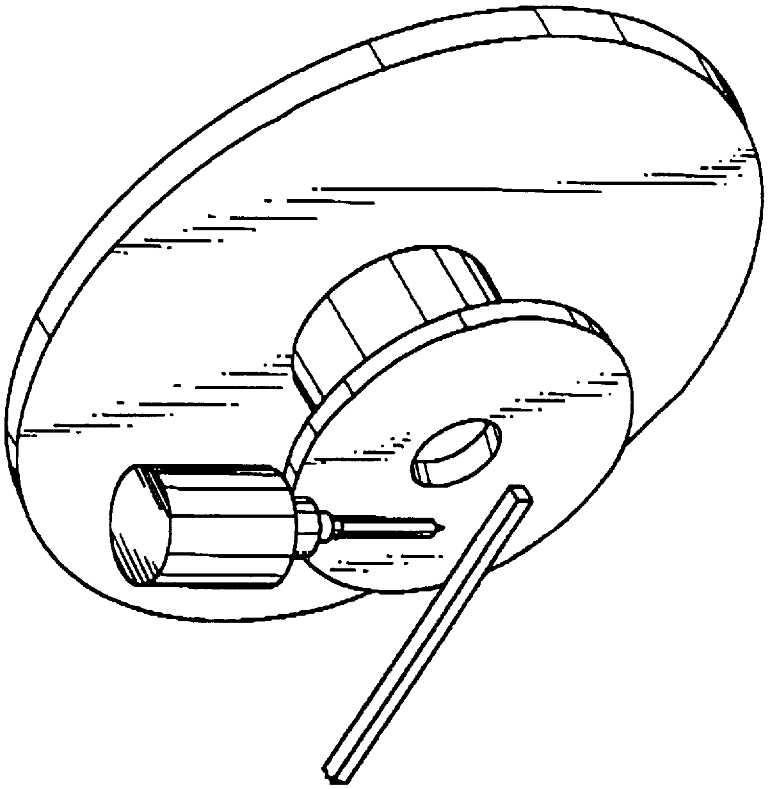

In another embodiment, the asymmetric electrode may comprise a wire, as illustrated in FIG. 4B. FIG. 4A illustrates the electric fields generated within an ionization chamber of the invention employing such an asymmetric electrode and wherein the electrospray assembly and the capillary assembly or orifice are in substantially crossflow orientation. Such an electric field is sufficient to initiate and sustain electrospray ionization with a suitably charged dispersion being generated.

The asymmetric electrode is preferably fabricated from a material providing the requisite structural strength and durability and which is electrically conductive, such as stainless steel. Means of supplying a high voltage to the asymmetric electrode typically include wires and electrical contacts. During operation, an electrical potential difference is generated between the asymmetric electrode and the electrospray assembly exit on the order of about 1,000 volts to about 8,000 volts. The asymmetric electrode may be operated in positive or negative mode. The asymmetric electrode is operated at a voltage, the absolute value of which is preferably from about 1,000 volts to about 8,000 volts, more preferably from about 2,500 volts to about 6,000 volts.

Figure 5:
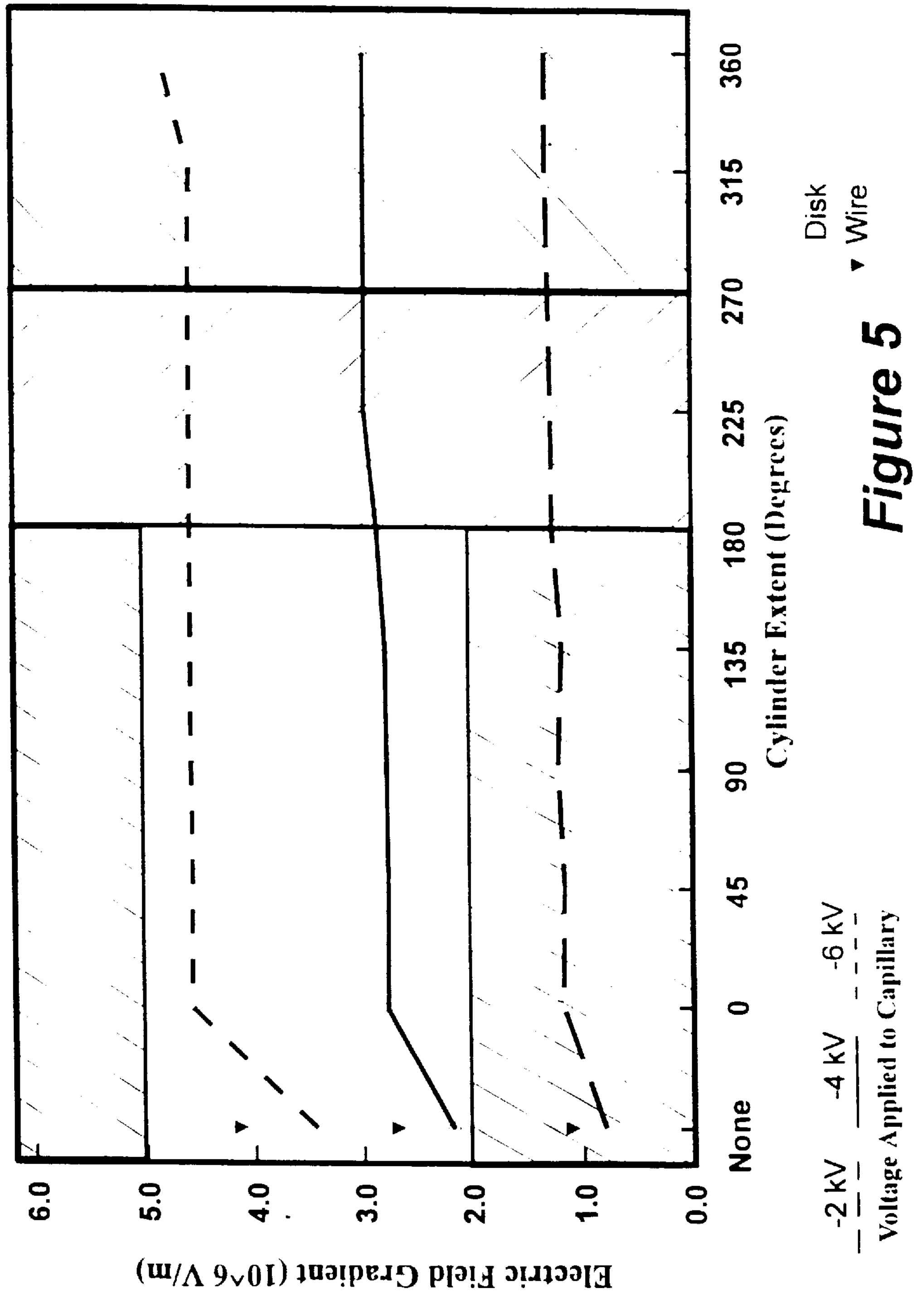
FIG. 5 illustrates a preferred operating envelope for ionization chambers employing asymmetric electrodes, such as the embodiments illustrated in FIG. 2B (zero percent (0%) partial cylinder (flat semicircular plate) asymmetric electrode), FIG. 3B (flat circular disc asymmetric electrode), and FIG. 4B (wire asymmetric electrode).

FIG. 5 illustrates a preferred operating envelope for an ionization chamber employing a partial cylinder as the asymmetric electrode, such as the embodiment illustrated in FIGS. 1A and 1B, and a capillary assembly as the ion sampling means. The performance of alternate asymmetric electrodes, such as a flat circular disc or wire as illustrated in FIGS. 3B and 4B respectively, are also depicted. The electric field gradient (y axis) is plotted as a function of extent of circumference of the partial cylinder electrode (x axis) for several different capillary assembly voltages. The plots at capillary assembly voltages of −2 kV, −4 kV, and −6 kV illustrate that at a minimum for a partial cylinder electrode, a flat semicircular plate (that is, a partial cylinder having a circumference which is zero percent (0%) of the circumference of a full cylinder) is required to initiate and sustain electrospray. For moderate liquid sample flowrates, for example, from about 1 microliter/minute to about 400 microliters/minute, the circumference of the partial cylinder asymmetric electrode is preferably less than about 270 degrees in order to avoid electrical arcing due to condensation. For high liquid sample flowrates, for example, from about 400 microliters/minute to about 2,000 microliters/minute, the circumference of the partial cylinder asymmetric electrode is preferably less than about 180 degrees in order to avoid electrical arcing due to condensation. Most preferably, the electric field gradient is between about $2\times10^6$ volts/meter and about $5\times10^6$ volts/meter.

As illustrated in FIG. 1, the ionization chamber optionally includes a drain port or vent (160), which is preferably located such that liquid condensate or other liquid or solvent vapor can readily drain away from the inner surfaces of the ionization chamber and the asymmetric electrode, electrospray assembly, and ion sampling means. The drain port or vent is advantageously located in a substantially opposed position from the exit of the electrospray assembly; that is, the drain port or vent is substantially 180 degrees opposed to the exit of the electrospray assembly. Alternatively, the drain port or vent may be arranged in facing relation with, but have a central axis that is linearly or angularly offset from, the exit of the electrospray assembly.

With reference to FIGS. 1A and 1B, during operation a liquid sample containing analyte enters the electrospray assembly (120) and is introduced into ionization region (105) within the ionization chamber (100) via exit (123). Liquid flowrates are typically in the range of from about 1 microliter/minute to about 2,000 microliters/minute. The ionization region (105) within the ionization chamber (100) is optionally operated substantially at or near atmospheric pressure, that is, preferably between about 660 torr and about 860 torr, more preferably at or about 760 torr. The temperature within the ionization chamber is typically from about 20 degrees Celsius to about 450 degrees Celsius. Operation at ambient temperature is convenient and suitable for many applications. The source of the sample may optionally be a liquid chromatograph, capillary electrophoresis unit, supercritical fluid chromatograph, ion chromatograph, flow injector, infusion pump, syringe pump, or other sample introduction means (not shown). Optionally an inert nebulizing gas, such as nitrogen or carbon dioxide, or an inert nebulizing liquid may be introduced via concentric tube or sheath (124) to assist in the formation of the aerosol.

The sample leaving the electrospray assembly (120) via exit (123) is dispersed into charged droplets under the influence of the electric field generated within the ionization chamber (100). The charged droplets are typically evaporated and desolvated by heating or under the influence of drying gas introduced into the ionization chamber (100). The ions are induced to exit the ionization chamber (100) via an inlet in the ion sampling means such as capillary or orifice (150), by application of an electrical potential to the counter electrode (180). The ions entering the ion sampling means (150) subsequently enter into vacuum and/or mass analyzer chamber(s), not shown. Any suitable mass spectrometer may be used, for example quadrupole or multipole, magnetic or electric sector, Fourier transform, ion trap, and time-of-flight mass spectrometers.

The invention minimizes or eliminates electrical breakdown, shorting, arcing, or distortion of the electrical field since unevaporated droplets and condensation are not trapped within the open design of the asymmetric electrode. The asymmetric electrode generates an electric field within the ionization chamber sufficient to initiate and sustain electrospray.

Having thus described exemplary embodiments of the invention, it will be apparent that further alterations, modifications, and improvements will also occur to those skilled in the art. Further, it will be apparent that the present invention is not limited to the specific embodiments described herein. Such alterations, modifications, and improvements, though not expressly described or mentioned herein, are nonetheless intended and implied to be within the spirit and scope of the invention. Accordingly, the foregoing discussion is intended to be illustrative only; the invention is limited and defined only by the various following claims and equivalents thereto.

What is claimed is:

1. A mass spectrometer system comprising:

(a) a housing containing an ionization region;

(b) an electrospray assembly at a low voltage with respect to the housing;

(c) ion sampling means for receiving ions from the ionization region, wherein the ion sampling means is at a first high voltage with respect to the housing, the first high voltage having an absolute value;

(d) a counter electrode for attracting ions in the ionization region towards the ion sampling means, wherein the counter electrode is at a second high voltage having an absolute value with respect to the housing, the absolute value of the second high voltage being less than the absolute value of the first high voltage; and (e) an asymmetric electrode disposed in radial asymmetry with respect to the counter electrode and positioned relative to the electrospray assembly such that electrospray can be initiated and sustained, wherein the asymmetric electrode is at a third high voltage with respect to the housing, the third high voltage being substantially equal to the second high voltage.

2. The system of claim 1 further comprising: means for venting liquid or vapor from the ionization region of the housing.

3. The system of claim 2 wherein the electrospray assembly and the ion sampling means are arranged in a substantially cross-flow orientation.

4. The system of claim 3 wherein the ionization region is substantially at atmospheric pressure.

5. The system of claim 1 wherein the low voltage has an absolute value less than about 800 volts.

6. The system of claim 5 wherein the absolute value of the second high voltage is from about 1,000 volts to about 8,000 volts.

7. The system of claim 1 wherein the ion sampling means comprises a capillary assembly.

8. The system of claim 7 wherein the ionization region is substantially at atmospheric pressure.

9. The system of claim 1 wherein the asymmetric electrode comprises a flat circular disc.

10. The system of claim 1 wherein the asymmetric electrode comprises a wire.

11. The system of claim 1 wherein the asymmetric electrode comprises a partial cylinder having a circumference less than about 87.5 percent of a full cylinder.

12. The system of claim 1 further comprising: a mass analyzer.

13. The system of claim 12 wherein the mass analyzer is selected from a group consisting of quadrupole, multipole, magnetic, electric sector, Fourier transform, ion trap, and time of flight mass spectrometer.

14. The system of claim 1 further comprising:

a liquid chromatograph.

15. The system of claim 11 wherein the housing comprises an electrically conductive material.

16. The system of claim 12 wherein the ionization region is substantially at atmospheric pressure.

17. The system of claim 1 wherein the ionization region is substantially at atmospheric pressure.

18. The system of claim 1 further comprising: means for supplying the low voltage, the first high voltage, the second high voltage, and the third high voltage.

19. An ionization chamber comprising:

(a) a housing containing an ionization region;

(b) an electrospray assembly at a low voltage with respect to the housing;

(c) ion sampling means for receiving ions from the ionization region, wherein the ion sampling means is at a first high voltage with respect to the housing, the first high voltage having an absolute value;

(d) a counter electrode for attracting ions in the ionization region towards the ion sampling means, wherein the counter electrode is at a second high voltage having an absolute value with respect to the housing, the absolute value of the second high voltage being less than the absolute value of the first high voltage; and (e) an asymmetric electrode disposed in radial asymmetry with respect to the counter electrode and positioned relative to the electrospray assembly such that electrospray can be initiated and sustained, wherein the asymmetric electrode is at a third high voltage with respect to the housing, the third high voltage being substantially equal to the second high voltage.

20. The ionization chamber of claim 19 further comprising: means for venting liquid or vapor from the ionization region of the housing.

21. The ionization chamber of claim 20 wherein the electrospray assembly and the ion sampling means are arranged in a substantially cross-flow orientation.

22. The ionization chamber of claim 21 wherein the ionization region is substantially at atmospheric pressure.

23. The ionization chamber of claim 19 wherein the low voltage has an absolute value less than about 800 volts.

24. The ionization chamber of claim 23 wherein the absolute value,of the second high voltage is from about 1,000 volts to about 8,000 volts.

25. The ionization chamber of claim 17 wherein the ion sampling means comprises a capillary assembly.

26. The ionization chamber of claim 25 wherein the ionization region is substantially at atmospheric pressure.

27. The ionization chamber of claim 19 wherein the asymmetric electrode comprises a flat circular disc.

28. The ionization chamber of claim 19 wherein the asymmetric electrode comprises a wire.

29. The ionization chamber of claim 19 wherein the asymmetric electrode comprises a partial cylinder having a circumference less than about 87.5 percent of a full cylinder.

30. The ionization chamber of claim 17 wherein the ionization region is substantially at atmospheric pressure.

31. The ionization chamber of claim 19 further comprising: means for supplying the low voltage, the first high voltage, the second high voltage, and the third high voltage.

32. The ionization chamber of claim 19 wherein the housing comprises an electrically conductive material.

* * * * *